Nov. 13, 1928.
W. S. HOSKINS
1,691,572
BOLTER FOR CARBON BLACK, ETC
Filed Dec. 13, 1924    4 Sheets-Sheet 1

INVENTOR
Wm S Hoskins
BY
ATTORNEYS

Nov. 13, 1928.

W. S. HOSKINS 1,691,572

BOLTER FOR CARBON BLACK, ETC

Filed Dec. 13, 1924

INVENTOR
Wm. S. Hoskins
BY
ATTORNEYS

Nov. 13, 1928.
W. S. HOSKINS
1,691,572
BOLTER FOR CARBON BLACK, ETC
Filed Dec. 13, 1924     4 Sheets-Sheet 4
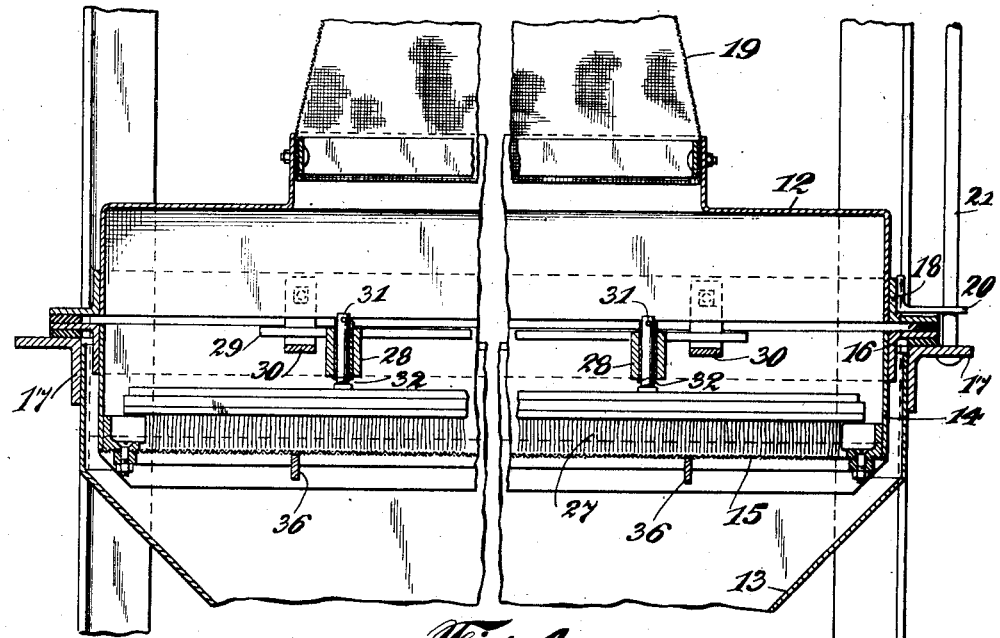
Fig. 4.
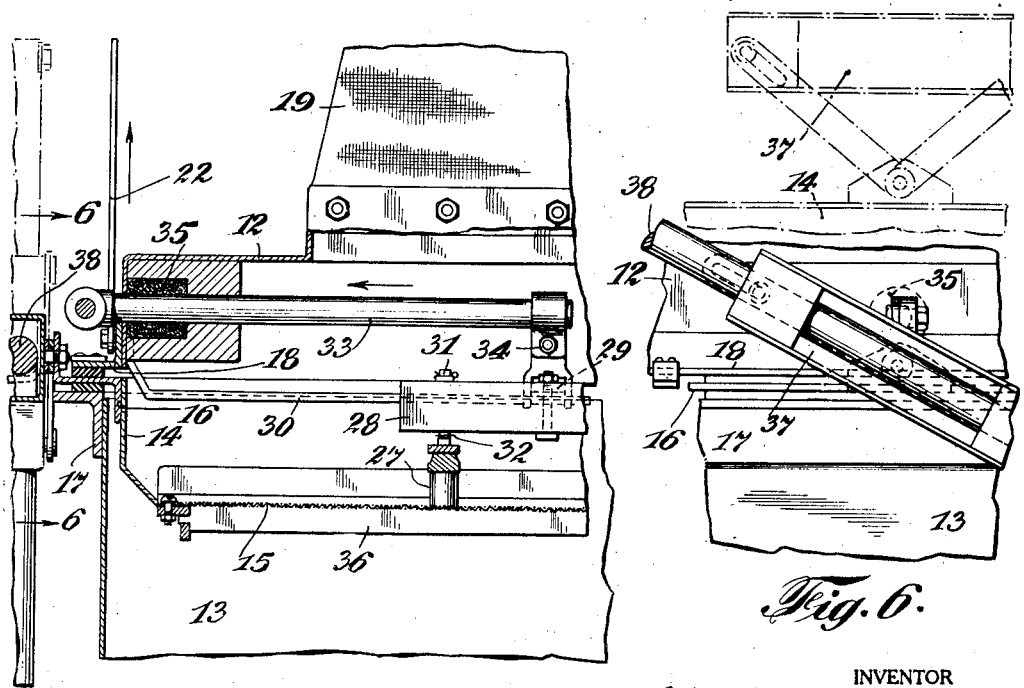
Fig. 5.
Fig. 6.
INVENTOR
Wm. S. Hoskins
BY
Dean, Fairbank, Obreght & Hirsch
ATTORNEYS Patented Nov. 13, 1928.

1,691,572

UNITED STATES PATENT OFFICE.

WILLIAM S. HOSKINS, OF WARREN, PENNSYLVANIA, ASSIGNOR TO COLUMBIAN CARBON COMPANY, OF WILLIAMSPORT, PENNSYLVANIA, A CORPORATION OF DELAWARE.

BOLTER FOR CARBON BLACK, ETC.

Application filed December 13, 1924. Serial No. 755,604.

This invention relates to the bolting of carbon black to remove the very small specks of gritty, hard, sharp carbon particles often found incorporated with the minute particles of carbon black, and which are extremely detrimental if the carbon black is to be used for such purposes as polishing pastes, buffing compounds, etc.

Carbon black is very light, and therefore although very fine, it does not readily pass through a screen, even though the mesh of the screen is of ample size to permit passage of the carbon black particles. It does not readily cake or form lumps, but the small, gritty particles often present therein form nuclei for small pellets. These gritty particles are extremely hard, and somewhat analogous to carborundum, and have a very injurious abrasive action on screens if they be forced over the surface of the latter. Rotating reel sieves do not give satisfaction because the ultra-fine particles of carbon coat the wires and clog the interstices, and the tailings are excessive because the rolling causes a balling action by coating the gritty particles with fine carbon to form pellets several times larger than the original speck of hard carbon forming the core of the pellet. Circular or disk shaped trays with revolving brushes do not give satisfaction because the circular motion of the brush tends to pile the carbon at the outer edge of the tray and away from the center. The brushes moving only in one direction in respect to the screen portion of the tray must be of a stiff material, otherwise a solid cake of carbon would be formed by the plastering up of the holes of the mesh with the fine clinging particles of carbon. Therefore stiff brushes are usually used and these have a tendency to distort the mesh and force the gritty particles through the apertures of the wire so stretched. The minute particles are hard and therefore abrasive, and the rubbing of them over the screen rapidly wears holes in the latter and permits the larger gritty particles to pass through. Thus continual inspection and emptying of the circular trays or sieves is necessary in order to insure the detection of small holes which would permit the passage of gritty particles.

The main object of my invention is to provide a bolting or sifting apparatus which will overcome the difficulties above referred to in connection with apparatus now employed for the bolting of carbon black.

In my improved apparatus I avoid pressing action which would tend to break up or crush the gritty particles or force them through the screen, and I avoid all rolling action which would coat the gritty particles with the finer carbon black.

I employ a very light sweeping action which will remove the carbon black from the grit without rubbing the grit on the screen to objectionably wear the latter or force the grit through.

My object is not to break up lumps but to lightly sweep the screens to keep the passages clear and let the carbon black go through. This is accomplished by brushes so mounted that they move back and forth, each over a limited section of the screen, and with very light pressure on the latter. The movement of the brushes first in one direction and then in the other, varies the action of the brushes on the screen so as to keep the interstices of the latter clear. The action of the brushes is sufficiently light to pass over a gritty particle without forcing the latter over the surface of the screen to give abrasive action, and without forcing the particle through the screen. The particles may be swept along in advance of the brush without being pressed on to the latter. The brushes are made up of fine hairs, rather than stiff bristles or steel brushes which have heretofore been employed.

I am aware that it has been proposed to use brushes movable back and forth over screens for the treatment of certain materials other than carbon black, but so far as I know, the character of the material treated and the nature of the brushes used have been such as to break up lumps and force all of the particles through the screen which can pass the mesh thereof.

In the accompanying drawings I have illustrated an apparatus embodying my invention, but it will be understood that the details thereof are not important or essential except in so far as they are defined in the appended claims. It will be understood that the specific apparatus shown is to be considered in an illustrative rather than in a limiting sense.

In these drawings:

Fig. 4 is a section on the line 4—4 of Fig. 1, but on a larger scale.

Fig. 5 is a section on the line 5—5 of Fig. 2 on the same scale as Fig. 4, and

Fig. 6 is a sectional detail on the line 6—6 of Fig. 5.

Figure 1:
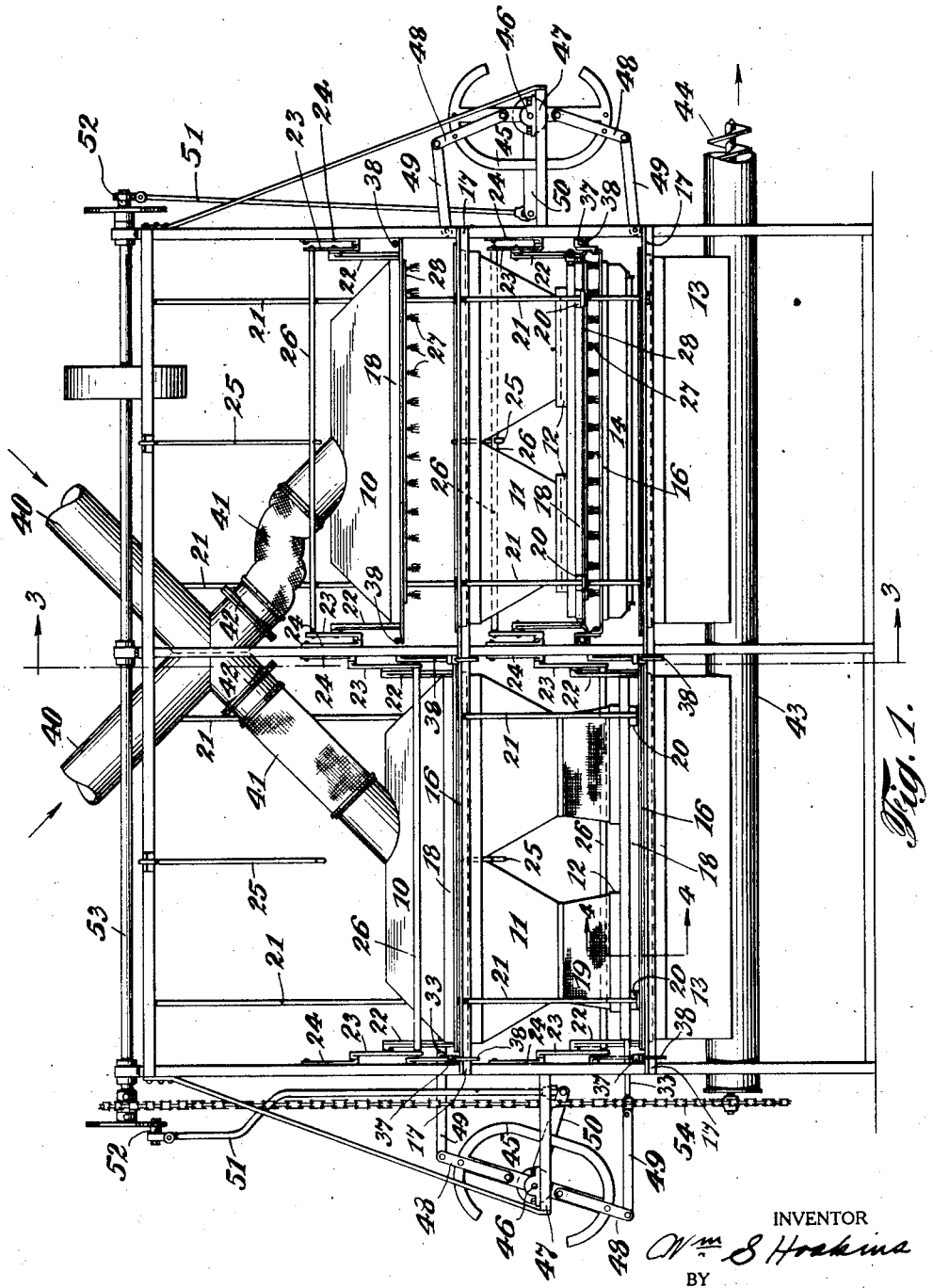
Fig. 1 is a side elevation, the casing at the right hand side being in open position.

The machine illustrated is of the duplex type, that is, it includes a duplicate set of parts whereby one may continue in operation while the screens of the other are being removed and cleaned. Each section of the machine includes a casing having therein a screen pan or tray and a series of brushes in operative relationship thereto. Preferably there are two superposed screen pans or trays and a separate set of brushes for each screen, so that the upper screen of coarser mesh may remove certain of the gritty particles, while the finer gritty particles may be removed by the lower screen to which the carbon black is delivered from the upper screen. The casing is made up of a plurality of sections relatively movable, whereby the screens and brushes may be separated vertically and the screens removed from the casing.

As illustrated each casing includes an upper section 10, a pair of superposed intermediate casing sections 11 and 12, and a lower or bottom section 13. The sections 10 and 11 form a housing for the upper screen and upper brush, while the other sections 12 and 13 form a housing for the lower screen and brush. The upper section 10 forms a cover, and the lower section 13 forms a bottom for the complete casing, while the sections 11 and 12 conduct the material from the upper screen to the lower one. It is important that the casing be tight because of the extremely light character of the carbon black and the tendency of the latter to move with air currents out through any apertures in the casing.

Supported between the casing sections 12 and 13 is a screen pan or tray having a peripheral wall 14 and a reticulated bottom 15. The upper edge of the wall 14 may be provided with any suitable form of support as for instance angle irons 16 having outwardly extending flanges adapted to rest upon the members 17 of the main frame. The casing section 12 may have a somewhat similar angle iron support 18 which may rest upon the angle irons 16 of the screen pan, with suitable gasket strips above and below the outwardly extending flanges of the latter. Thus a substantially air-tight joint is formed between the two casing sections. One of the two casing sections is vertically movable in respect to the other to permit the removal of the screen pan. As shown, the section 12 has a flexible wall portion 19 whereby the lower part may be raised in respect to the casing section 11. The casing section 12 may have brackets 20 vertically slidable upon guide rods 21 forming a portion of the main frame.

Figure 2:
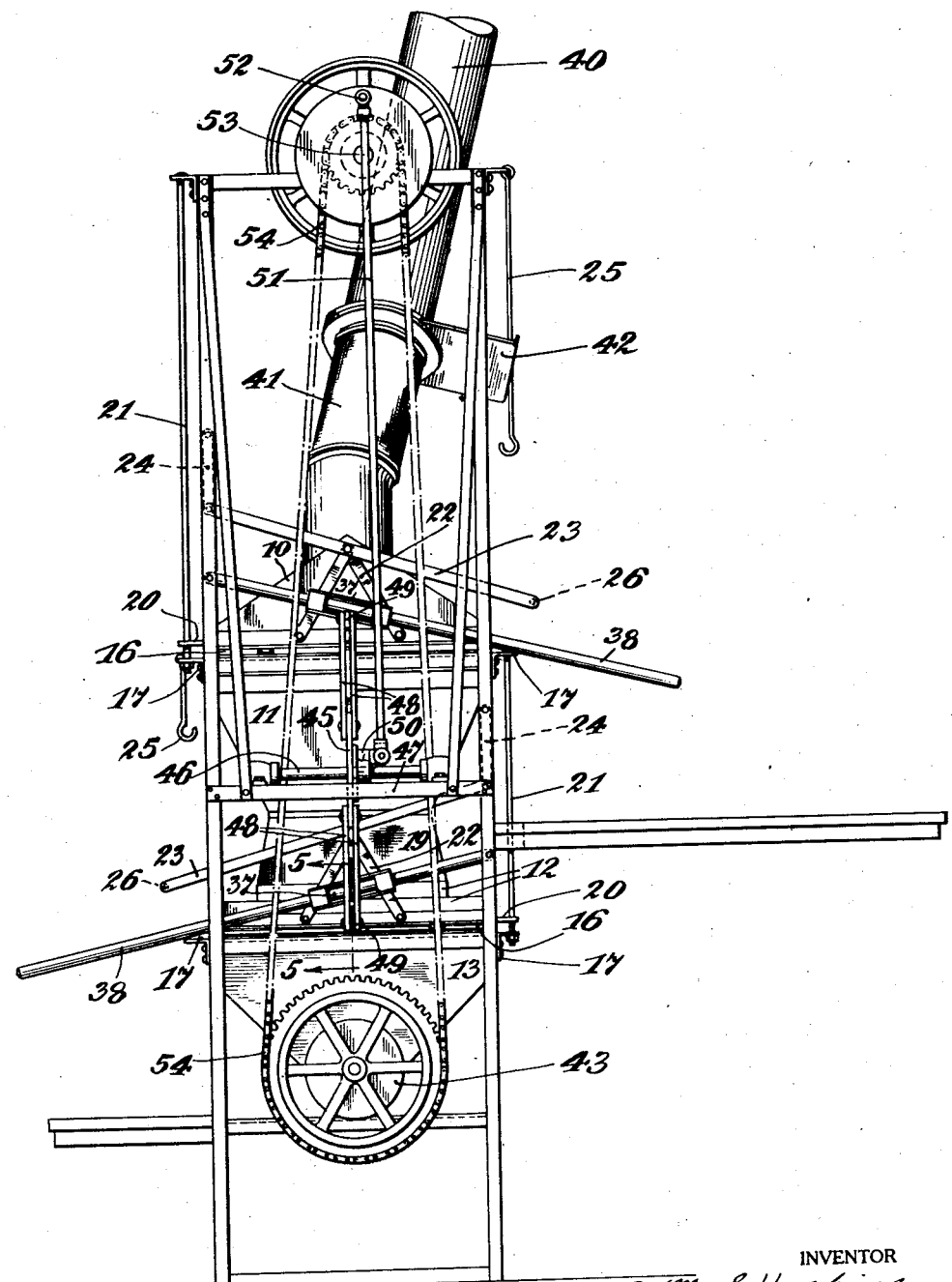
Fig. 2 is a view of the left hand end of the machine.

For raising the casing section 12 any suitable means may be employed. As illustrated particularly in Figs. 2 and 3, the ends of the casing section 12 are connected by links 22 to a lever 23. One end of the lever 23 is suspended from the frame by links 24, while the opposite end may be raised or lowered to raise or lower the casing section 12. When in raised position it may be held by a hook 25 or any other suitable form of retainer. The two levers 23 at opposite ends of the casing section may be connected together by a transverse rod 26 to insure simultaneous action of both ends of the casing section, and form a handle.

For cooperation with the screen 15 there is provided a brush mechanism which includes a series of brushes 27 extending transversely of the screen, and each of a length substantially equal to the width of the latter. The brushes are attached to a frame mechanism including a pair of longitudinally extending members 28 connected by cross-members 29, the latter being supported by guides 30 attached at opposite ends to the casing section 12. Each brush is vertically movable in respect to the brush operating frame, whereby the bristles of the brush do not need to support the frame. As shown, each brush back has a pair of pins 31 vertically slidable in the frame members 28 and held down by very light springs 32.

For reciprocating the brush mechanism there is provided a reciprocatory rod 33 which is connected to the brush frame in any suitable manner, as for instance by a clamping mechanism 34 shown in Fig. 5, and this rod extends through a stuffing box 35 in one end wall of the casing section 12. By reciprocating this rod the brushes may be given a comparatively short back and forth movement and have a light sweeping action on the screen. The range through which the parts are reciprocated is preferably but slightly greater than the distance between adjacent brushes. The screen is of very fine mesh, the lower one being preferably of about 80 mesh, and is supported so as to prevent sagging and to hold it in the proper plane for uniform action thereon by the brushes. As shown, the wall 14 of the screen pan has a series of longitudinal and transverse braces 36 beneath the screen and engaging with the under side of the latter.

Figure 3:
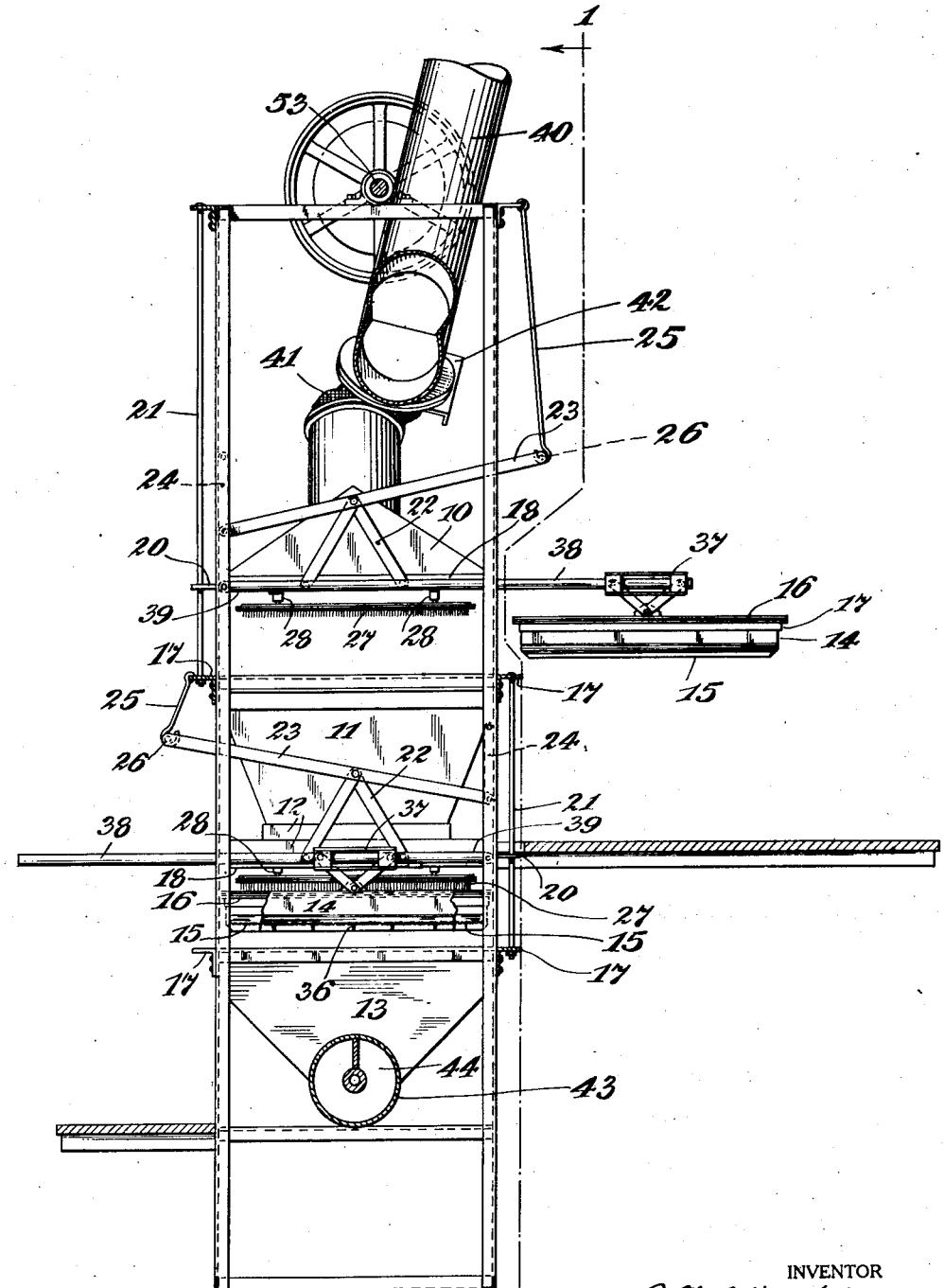
Fig. 3 is a section on the line 3—3 of Fig. 1.

As the brush frame is carried by the guides 30 which are attached to the casing section 12, it will be obvious that when the latter is raised by lifting the handle 26, the brushes will be lifted to a corresponding extent and to a position considerably above the upper edge of the screen pan. This permits the screen pan to be raised out of the casing section 13 and removed for cleaning. Any suitable mechanism may be provided for raising and removing the screen pan. As shown, the pan at each end is pivotally connected to a slide 37 mounted upon a transversely extending rod 38. Each rod has one end 39 pivoted to the frame so that upon raising the opposite end the screen pan is lifted out of the casing section 13. While the rods 38 are held in raised position, the slide 37 may be moved along the rods to carry the screen pan to a position outside of the casing, as shown in Fig. 3. The screen may then be tilted about its pivotal connection to the slides 37 so as to dump out any grit particles which have accumulated therein.

The upper casing section 10 is vertically movable in the same way as the casing section 12, and the screen pan and brush mechanism mounted between the casing sections 10 and 11 may be substantially identical with that between the lower casing sections 12 and 13, except that the upper screen may be of slightly coarser mesh, as for instance about 50. Also, the lever mechanism and the screen removing mechanism may be so mounted that one is operated from one side of the machine and the other from the other side, although obviously this is not essential. They may be connected for simultaneous operation.

The material may be delivered to the apparatus in any suitable manner, as for instance through either of a pair of conduits 40, and these may be connected together and thence led to the two casing sections 10 by flexible conduit sections 41 which permit the vertical movement of the casing sections 10. Dampers 42 may be employed at the upper end of each flexible conduit section 41, whereby either damper may be closed to send all of the material to the other set of screens while one casing is being opened up and the screens thereof cleaned.

The two lower casing sections 13 are preferably of hopper shape so that they taper downwardly to a conduit 43 which may include a screw conveyor 44 for continuously removing the screened or bolted material.

For reciprocating the brushes there is provided oscillatory mechanism which may actuate both the upper and lower brushes. As shown, there is an oscillatory member 45 mounted on a transverse shaft 46 journaled in an auxiliary frame 47. The shaft is mounted midway between the planes of the two brushes and has upwardly and downwardly extending arms 47 each of which may be connected by a link 49 to the corresponding brush operating rod 33. The connection between each link 49 and its corresponding rod 33 is such that the two may be readily separated when it is desired to raise the brushes and corresponding casing sections. At the left hand side of Fig. 1 the links are shown connected to their respective rods, whereas at the right hand side the links are disengaged and shown as merely resting upon the frame. For oscillating the member 45 the shaft 46 is provided with a lever arm 50 which is connected by a link 51 to an eccentric 52 on a drive shaft 53. For a duplex machine this shaft may extend the full length of the machine, and there may be separate oscillatory members, eccentrics, links, etc., at opposite ends, one set for operating the brushes of one casing and the other for operating those of the other casing. The same shaft 53 may be employed for driving the screw conveyor 44, and by any suitable means, as for instance by sprockets and a chain 54.

In the machine above described, it will be noted that the upper casing section for each brush and pan is raised, while the lower casing section is stationary. This is not essential, as the upper casing sections may be stationary and the brushes held against vertical movement, while the lower casing sections may be mounted to permit of their being dropped down from the upper casing sections. In such an arrangement the screen pans might be lowered with the casing sections through only a portion of the movement of the latter, and after reaching a predetermined position below the brushes the casing sections might continue their downward movement to a point below the screen pans, whereby the latter might be moved outwardly for dumping.

In my improved machine I am able to obtain a very much finer product than has heretofore been obtained in the bolting of carbon black. The light sweeping motion of the brushes prevents packing or clogging of the screens and any particles remaining in the interstices during a movement of the brush in one direction are removed during the return movement of the brush. The wear and tear on the screens is reduced to the minimum, and the capacity of the apparatus is materially increased due to the larger area for the same amount of powder to fall through and the action of the larger number of brushes in contact with the material, as distinguished from apparatus in which the material may pile up before the brush during the circular movement of the brush.

Although my improved machine is designed primarily for the bolting of carbon black, it will be obvious that many features of construction are equally adaptable for the use in the bolting of other fine, light pulverulent materials. It will also be evident, as previously noted, that many features of the construction may be altered within the scope of the invention. For instance, in a machine which has been built and tested, the drive shaft has been placed below rather than above the casing, and the oscillatory member for actuating the brushes was in the form of a pulley or drum with belts wound in reverse directions thereon, and connected to the brushes for operating the latter upon the oscillation of the drum.

Having thus described my invention, what I claim as new and desire to secure by Letters Patent is:—

1. A bolter for pulverulent material including a casing having upper and lower separable sections, a screen within said casing, a frame above said screen, brushes carried by said frame in operative relationship to said screen, means for moving said frame back and forth, guiding means for said frame carried by said upper section, lost motion connections between said guiding means and said frame and permitting relative vertical movement, whereby the weight of the brushes is supported by said screen, and means for effecting a relative vertical movement of said sections to separate them, said guiding means serving to support said frame and brushes when the casing sections are separated.

2. A bolter for pulverulent material including a casing having upper and lower separable sections, a screen within the casing, a brush movable back and forth over said screen, means for effecting a vertical movement of one section in respect to the other to separate them, and means within the upper section for supporting the brush when the casing sections are separated but permitting the weight of the brush to be supported by the screen when said casing sections are together.

3. A bolter for pulverulent material including a casing having upper and lower sections relatively movable vertically, a screen within said casing, a series of parallel brushes, means for moving the latter back and forth over said screen with the weight of the brushes resting on said screen, and a guide in said upper casing section serving to support the brushes only when the casing sections are separated.

4. A bolter for pulverulent material including a closed casing having upper and lower sections relatively movable vertically, a screen pan within the lower section, means for separating said sections, and means for lifting said pan out of said lower section, said means having guiding portions for the horizontal outward movement of the screen from between said sections.

5. A bolter for pulverulent material including a casing having upper and lower sections, means for separating said sections, a screen within said casing, a guide upon which said screen may be moved substantially horizontally upon separation of the casing sections, and pivotal connections between said screen and said guide permitting a tilting movement of the screen when outside of the casing.

6. A bolter for pulverulent material including a casing having a pair of spaced superposed screens therein, said casing having a wall section between said screens, vertically movable and including a flexible portion, and lever mechanism for moving said section vertically and collapsing said flexible portion to permit removal of one of said screens.

7. A bolter for pulverulent material including a casing having a substantially horizontal screen therein, a section of the wall of said casing being vertically movable and having a flexible portion, and means for moving said section to permit removal of said screen.

8. A bolter for pulverulent material, including a pair of superposed casing sections, a screen pan disposed within the lower section and having a peripheral flange resting upon the upper edge of the lower section, said upper casing section having a flange resting upon said flange of the screen pan, a series of brushes within said casing and movable over the upper surface of the screen pan, operating means for said brushes, connected to the upper section of the casing, and means for separating said casing sections to thereby separate the brushes and screen pan and permit the removal of the screen pan from the lower section.

Signed at Warren, in the county of Warren, and State of Pennsylvania, this third day of December, A. D. 1924.

WILLIAM S. HOSKINS.